(12) United States Patent
McCroskey et al.

(10) Patent No.: US 7,921,337 B2
(45) Date of Patent: Apr. 5, 2011

(54) SYSTEMS AND METHODS FOR DIAGNOSING FAULTS IN ELECTRONIC SYSTEMS

(75) Inventors: Robert C. McCroskey, Burnsville, MN (US); Dinkar Mylaraswamy, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 425 days.

(21) Appl. No.: 12/130,478

(22) Filed: May 30, 2008

(65) Prior Publication Data
US 2009/0300429 A1 Dec. 3, 2009

(51) Int. Cl.
*G06F 11/00* (2006.01)
(52) U.S. Cl. .......................................... 714/48; 714/25
(58) Field of Classification Search .................. 714/48, 714/47, 37, 39, 44, 25, 4
See application file for complete search history.

(56) References Cited

U.S. PATENT DOCUMENTS

| | | | |
|---|---|---|---|
| 4,070,705 A | 1/1978 | Lockwood et al. | |
| 4,302,813 A | 11/1981 | Kuirhara et al. | |
| 5,448,722 A | 9/1995 | Lynne et al. | |
| 5,515,384 A * | 5/1996 | Horton, III | 714/732 |
| 5,552,984 A | 9/1996 | Crandall et al. | |
| 5,646,600 A | 7/1997 | Abdel-Malek et al. | |
| 5,710,723 A | 1/1998 | Hoth et al. | |
| 6,115,656 A | 9/2000 | Sudolsky | |
| 6,199,018 B1 | 3/2001 | Quist et al. | |
| 6,295,488 B1 | 9/2001 | Longere | |
| 6,405,108 B1 | 6/2002 | Patel et al. | |
| 6,434,512 B1 | 8/2002 | Discenzo | |
| 6,480,770 B1 | 11/2002 | Wischmeyer | |
| 6,728,658 B1 | 4/2004 | Bechhoefer | |
| 6,766,230 B1 | 7/2004 | Rizzoni et al. | |
| 6,950,781 B2 | 9/2005 | Gomez et al. | |
| 7,124,059 B2 | 10/2006 | Wetzer et al. | |
| 7,132,845 B1 * | 11/2006 | Lamson et al. | 324/765 |
| 7,149,612 B2 | 12/2006 | Stefani et al. | |
| 7,206,965 B2 | 4/2007 | Roddy et al. | |
| 7,230,527 B2 | 6/2007 | Basu et al. | |
| 7,233,886 B2 | 6/2007 | Wegerich et al. | |
| 7,243,270 B2 | 7/2007 | Taniguchi et al. | |
| 7,251,550 B2 | 7/2007 | Eschborn et al. | |
| 7,257,501 B2 | 8/2007 | Zhan et al. | |
| 7,280,954 B2 | 10/2007 | Belenger et al. | |
| 7,287,195 B1 | 10/2007 | Folkesson | |
| 7,305,466 B1 | 12/2007 | Kaffine et al. | |
| 7,421,637 B1 * | 9/2008 | Martinez et al. | 714/739 |
| 2003/0233178 A1 | 12/2003 | Sinex | |
| 2005/0223281 A1 * | 10/2005 | Maly et al. | 714/20 |
| 2006/0041808 A1 * | 2/2006 | Yamamura | 714/738 |
| 2007/0239361 A1 | 10/2007 | Hathaway | |

* cited by examiner

*Primary Examiner* — Dieu-Minh Le
(74) *Attorney, Agent, or Firm* — Ingrassia Fisher & Lorenz

(57) ABSTRACT

Apparatus, systems, and methods for identifying a fault in an electronic system are provided. One apparatus includes memory storing a model of the electronic system, a processor, and a fault module. The processor is configured to pass system inputs through the model to generate corresponding simulated outputs, and the fault module is configured to determine the fault based on a comparison of the system outputs and the simulated outputs. A system includes an electronic system including multiple components generating system outputs based on system inputs and the apparatus for identifying a fault in the electronic system discussed above. One method includes generating a model of the electronic system, passing one or more inputs to the electronic system through the model to generate corresponding simulated outputs, and determining the fault based on a comparison of the one or more simulated outputs and one or more electronic system outputs.

18 Claims, 3 Drawing Sheets

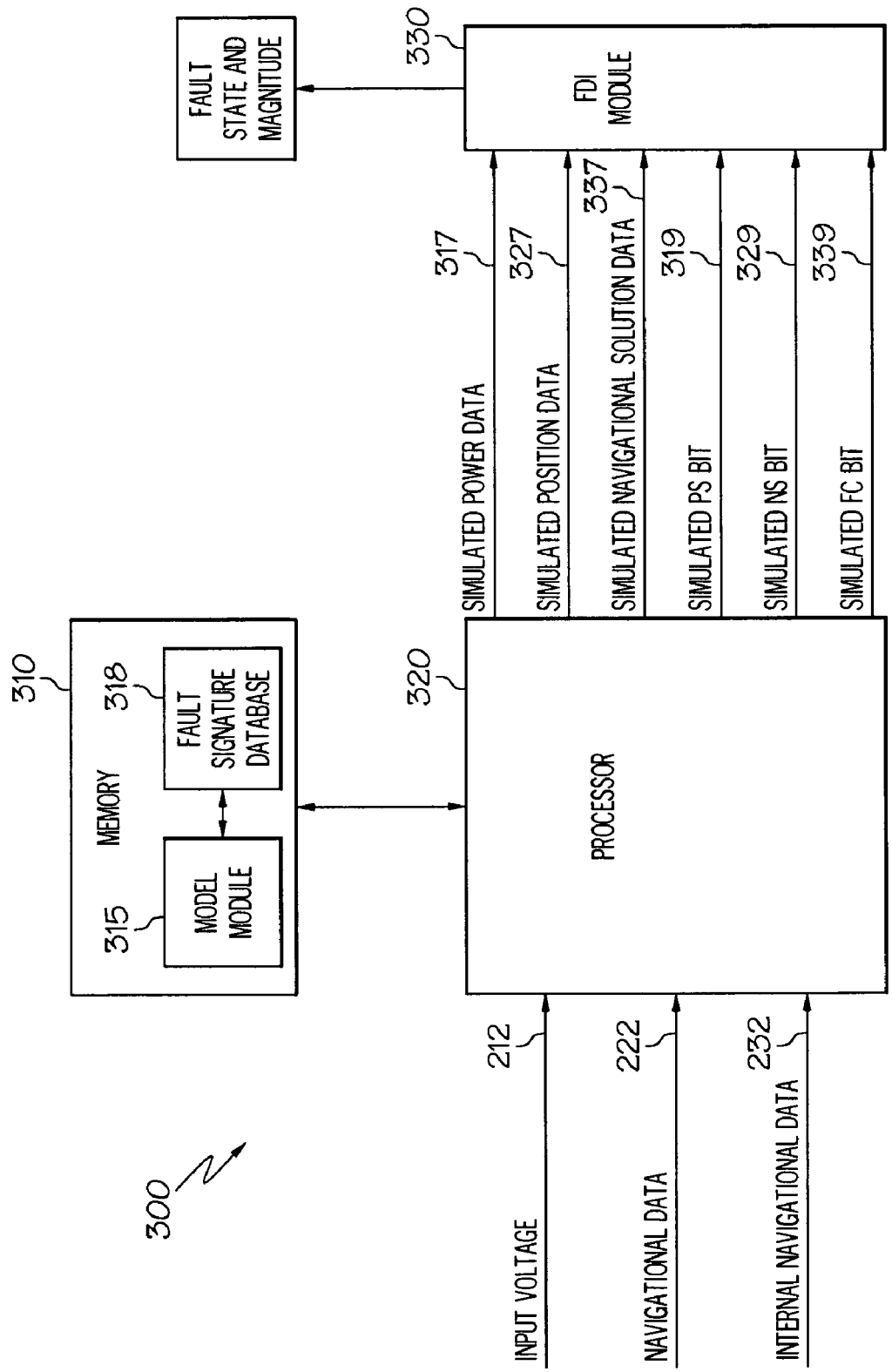

SYSTEMS AND METHODS FOR DIAGNOSING FAULTS IN ELECTRONIC SYSTEMS

FIELD OF THE INVENTION

The present invention generally relates to electronic systems, and more particularly relates to systems and methods for diagnosing faults in electronic systems.

BACKGROUND OF THE INVENTION

As complexity in electronic systems increases, gaining an understanding of the "state" of the system through diagnostics and prognostics provides an opportunity to improve overall operations that results in reduced cost and or new efficiencies. Current fault detection systems may have extensive Built-In Test (BIT) or other diagnostic coverage at the component/sub-system level of an electronic system, but little or no knowledge of the interdependence of the various components contained within the electronic system. As a result, it is postulated that a system level failure or a line replaceable unit (LRU) failure could lead to a BIT failure being reported by one or more other LRUs. Without the proper knowledge of the interdependence of the various components contained within the electronic system, one or more LRUs may be unnecessarily removed and/or tested before the fault is determined.

Accordingly, it is desirable to provide systems and methods for determining a fault in an electronic system by understanding the interdependence of the various components of the electronic system. In addition, it is desirable to provide systems and methods for modeling the electronic system so that the interdependence of the various components can be understood. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide an apparatus for diagnosing a fault of a plurality of faults in an electronic system having a plurality of components based on one or more system inputs and system outputs of the electronic system. One apparatus comprises memory storing a model of the electronic system, the model configured to capture functional dependencies of the plurality of components, a causal flow in time of data transmitted between the plurality of components, or both. The apparatus further comprises a processor coupled to the memory, and a fault detection/isolation (FDI) module coupled to the processor and configured to be coupled to the electronic system. The processor is configured to pass the one or more system inputs through the model to generate one or more simulated outputs, and the FDI module is configured to determine the fault based on a comparison of the one or more system outputs and the one or more simulated outputs.

Systems for diagnosing an electronic system fault are also provided. A system comprises an electronic system including a plurality of components generating one or more system outputs based on system inputs. The system further comprises memory storing a model of the electronic system, the model configured to capture functional dependencies of the plurality of components, a causal flow in time of data transmitted between the plurality of components, or both. The system further comprises a processor coupled to the memory, and a fault detection/isolation (FDI) module coupled to the processor and to the electronic system. The processor is configured to pass the one or more system inputs through the model to generate one or more simulated outputs, and the FDI module is configured to determine the fault based on a comparison of the one or more system outputs and the one or more simulated outputs.

Also provided are methods for identifying a fault of a plurality of faults in an electronic system including a plurality of components. One method comprises the step of generating a model of the electronic system, the model capturing functional dependencies of the plurality of components, a causal flow in time of data transmitted between the plurality of components, or both. The method further comprises the steps of passing one or more inputs that are supplied to the electronic system through the model to generate one or more simulated outputs, and determining the fault based on a comparison of the one or more simulated outputs and one or more outputs of the electronic system.

BRIEF DESCRIPTION OF THE DRAWINGS

The present invention will hereinafter be described in conjunction with the following drawing figures, wherein like numerals denote like elements.

FIG. 3 is a block diagram of one exemplary embodiment of the fault detection system included in the vehicle of FIG. 1.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various embodiments of the invention provide systems and methods for determining a fault in an electronic system by modeling the interdependence of the various components of the electronic system. In addition, various embodiments provide systems and methods for determining the fault based on comparing faulty outputs of the electronic system to simulated outputs for the electronic system generated by a model of the electronic system.

Figure 1:
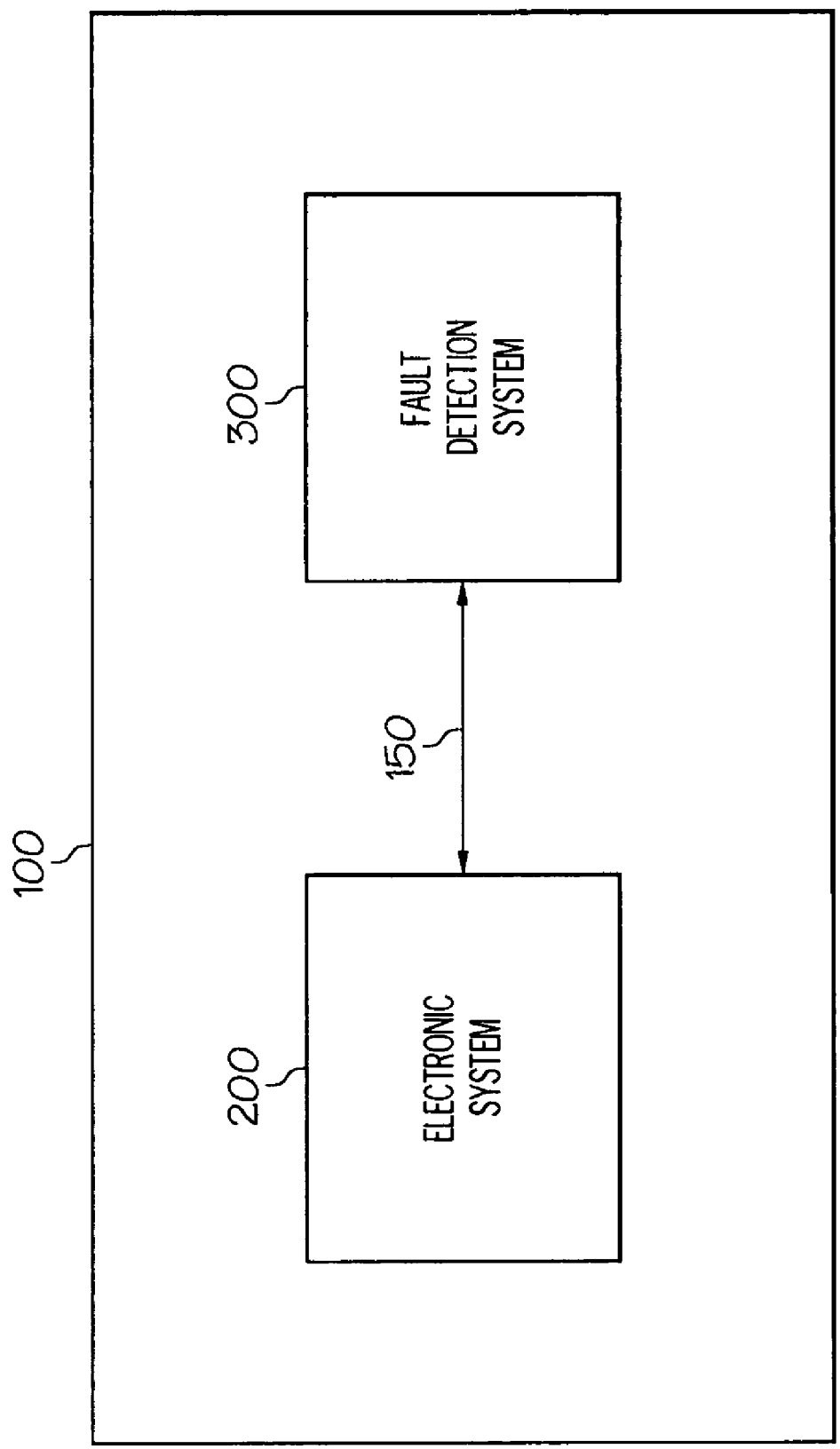
FIG. 1 is a block diagram of a vehicle including an electronic system and a fault detection system for identifying a fault in the electronic system.

FIG. 1 is a block diagram of a vehicle (e.g., an aircraft, a spacecraft, a satellite, a rocket, etc.) 100 including an electronic system 200 and a fault detection system 300 for determining a fault in electronic system 200. As illustrated, electronic system 200 is wired and/or wirelessly coupled to fault detection system 300 via a bus 150.

Figure 2:
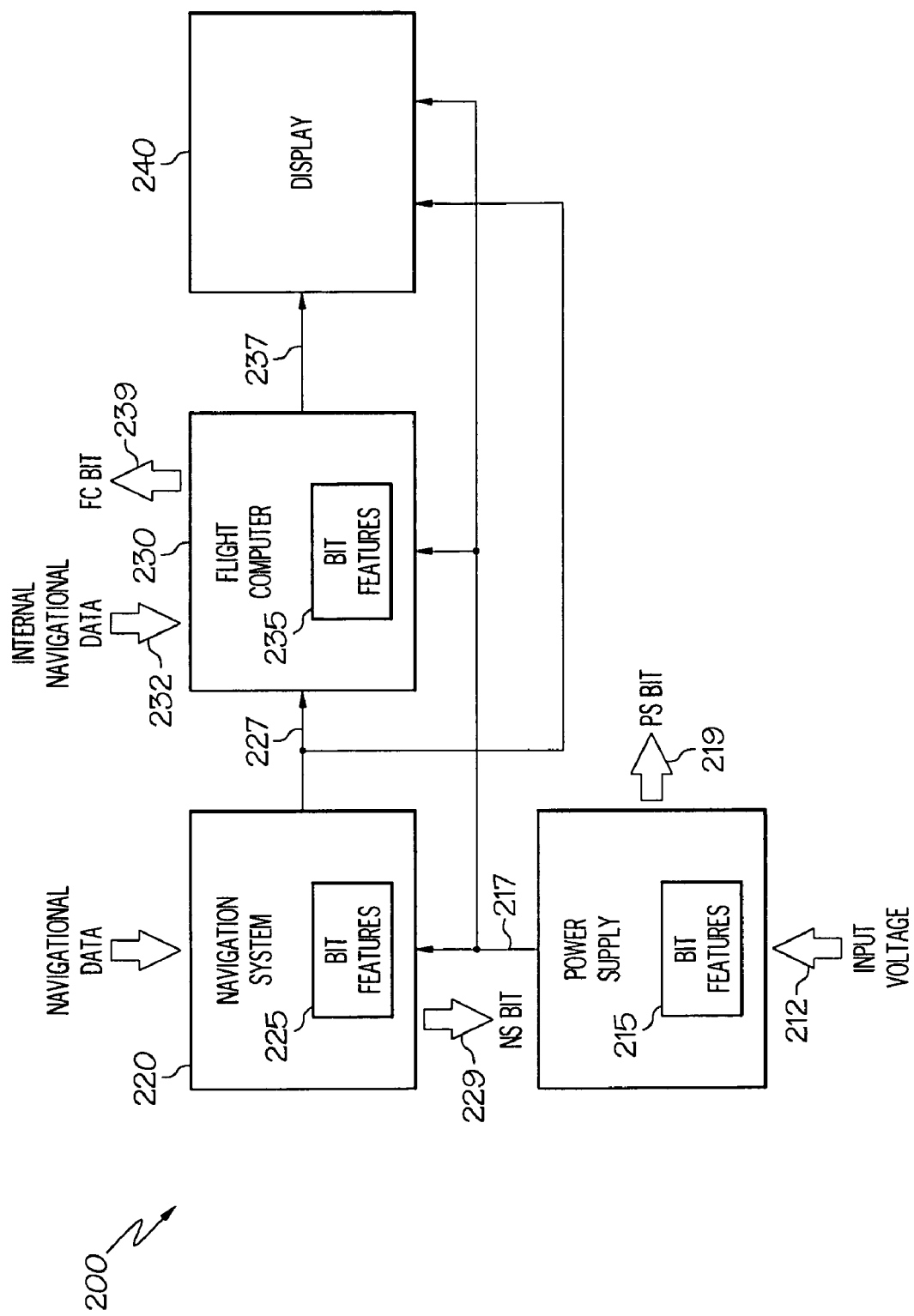
FIG. 2 is a block diagram of the electronic system included in the vehicle of FIG. 1.

Electronic system 200 may be any electronic system including components that interact with one another. In the example illustrated in FIG. 2, electronic system 200 includes a power source 210 coupled to a navigation system 220 (a global positioning system (GPS)), a flight computer 230 coupled to power source 210 and navigation system 220, and a display 240 coupled to power supply 210, navigation system 220, and flight computer 230. While electronic system 200 is illustrated as including power source 210, navigation system 220, flight computer 230, and display 240, the invention is not limited to electronic system 200. That is, one skilled in the art will recognize that fault detection system 100 may be utilized to determine faults in various other types of electronic systems in addition to fault detection system 100, and electronic system 200 is but one example of an electronic system which with fault detection system 100 may be used.

Power supply 210 is configured to receive an input voltage ($V_{dc}$) 212 and supply regulated power 217 to navigation system 220, flight computer 230, and display 240. Power supply 210 includes built-in test (BIT) hardware and/or software features 215 that enable power supply 210 to perform self-testing and output a result (PS BIT 219) of such self-testing. That is, BIT features 215 enable power supply 210 to test its own operation (e.g., functionally, parametrically, or both), or the amount of power that power supply 210 is supplying and PS BIT 219 reflects, for example, the amount of power 217 that power supply 210 is supplying and the input voltage 212 that power supply 210 is receiving.

Navigation system 220 is configured to receive navigational data 222 from one or more external sources (e.g., a satellite, base station, etc., not shown) and generate position data 227 representing a present position of electronic system 200 based on the received navigational data 222. Navigation system 220 also includes BIT hardware and/or software features 225 that enable navigation system 220 to perform self-testing and output a result (NS BIT 229) of such self-testing. That is, BIT features 225 enable navigation system 220 to test its own operation (e.g., functionally, parametrically, or both), and NS BIT 229 reflects, for example, the amount of power 217 that navigation system 220 is receiving from power supply 210, navigational data 222 received from the external source(s), and generated position data 227. Navigation system 220 is further configured to transmit position data 227 to flight computer 230 and display 240.

Flight computer 230 is configured to receive inertial navigational data 232 from sensors (not shown) and, as just noted, position data 227 from navigation system 220. Flight computer 230 is further configured to generate navigation solution data 237 based on the received position data 227 and inertial navigational data 232. Flight computer 230 also includes BIT hardware and/or software features 235 that enable flight computer 230 to perform self-testing and output a result (FC BIT 239) of such self-testing. That is, BIT features 235 enable flight computer 230 to test its own operation (e.g., functionally, parametrically, or both), and FC BIT 239 reflects, for example, the amount of power 217 that flight computer 230 is receiving from power supply 210, position data 227 received from navigation system 220, inertial navigational data 232 received from the sensors, and generated navigational solution data 237.

FIG. 3 is a block diagram of one exemplary embodiment of fault detection system 300. At least in the illustrated embodiment, fault detection system 300 includes a memory 310 coupled to a processor 320, and a fault detection/isolation (FDI) module 330 coupled to processor 320 and to an output of electronic system 200.

Memory 310 may be any system, device, hardware, firmware, or combinations thereof capable of storing a model module 315 and a fault signature database 318. Model module 315 represents a model of electronic system 200, and fault signature database 318 stores fault signature data representing one or more fault signatures for various fault conditions that electronic system 200 may experience. In one embodiment, model module 315 comprises an algorithm that captures the topological (e.g., system connectivity) and functional (e.g., the relationship between two or more signals) dependencies of electronic system 200 (e.g., the topological and functional dependencies of power source 210, navigation system 220, flight computer 230, and display 240). In another embodiment, model module 315 comprises an algorithm that captures the causal flow in time (e.g., the order in which signals or changes in signals flow through the model) of data between the various components of electronic system 200 (power source 210, navigation system 220, flight computer 230, and display 240). In yet another embodiment, model module 315 comprises an algorithm that captures the topological and functional dependencies of electronic system 200, and the causal flow in time between the various components of electronic system 200. Collectively, model module 315 is configured to model the interaction (physically and/or communicatively) between power source 210, navigation system 220, flight computer 230, and display 240. That is, model module 315 is configured to generate data representing the outputs of the various components (i.e., power source 210, navigation system 220, and flight computer 230) of electronic system 200, as well as the system output for electronic system 200, based on the inputs electronic system 200 and the various components receive therein. In other words, model module 315 is configured to mimic both the physical and data interactions of electronic system 200, as a whole, in addition to the operation of the various components of electronic system 200.

Specifically, model module 315 is configured to generate simulated power data 317 representing the amount of power 217 that power supply 210 should supply based on input voltage 212; simulated position data 327 representing the position data 227 that navigation system 220 should produce based on navigational data 222 and power 217; and simulated navigational solution data 337 representing the flight data 237 that flight computer 230 should produce based on position data 227, inertial navigational data 232, and power 217. Furthermore, model data 215 generates a simulated PS BIT 319 representing the PS BIT 219 (i.e., data representing the amount of input voltage 212 and output power 217) that BIT features 215 should be producing, a simulated NS BIT 329 representing the NS BIT 229 (i.e., data representing power 217 and navigational data 222) that BIT features 225 should be producing, and a simulated FC BIT 339 representing the FC BIT 239 (i.e., data representing power 217, position data 227, inertial navigational data 232, and navigational solution data 237) that BIT features 235 should be producing.

The fault signature data stored in fault signature database 318, in one embodiment, changes the parameters of one or more components in the model to represent various faults that electronic system 200 is capable of experiencing. That is, the fault signature data modifies the parameters related to one or more of, in the example disclosed herein, power source 210, navigation system 220, and flight computer 230. In other words, the fault signature data modifies the model of electronic system 200 such that the output of the model simulates one or more possible fault conditions. As such, fault signature database 318 may store fault signature data to modify the parameters of the model to represent multiple fault conditions for electronic system 200. The fault signature data and the model of electronic system 200 may then be used by processor 320 to identify a particular fault that electronic system 200 is experiencing.

Processor 320 may be any system, device, hardware, firmware, or combinations thereof capable of receiving input voltage 212, navigational data 222, and inertial navigational data 232. Processor 320, in one embodiment, is configured to execute model module 315 with one or more parameters modified by the fault signature data stored in fault signature database 318 (or without modified parameters to represent a properly operating electronic system 200) to generate one or more of simulated power data 317, simulated position data 327, simulated navigational solution data 337, simulated PS BIT 319, simulated NS BIT 329, and simulated FC BIT 339 based on input voltage 212, navigational data 222, and inertial navigational data 232. The generated simulated power data 317, simulated position data 327, simulated navigational solution data 337, simulated PS BIT 319, simulated NS BIT 329, and simulated FC BIT 339, along with power 217, position data 227, navigational solution data 237, PS BIT 219, NS BIT 229, and FC BIT 239 are transmitted to FDI module 330 so that a fault condition for electronic system 200 may be identified.

FDI module 330 may be any system, device, hardware, firmware, or combinations thereof capable of determining/identifying a fault condition and a magnitude of the fault condition for electronic system 200 based on one or more of simulated power data 317, simulated position data 327, simulated navigational solution data 337, simulated PS BIT 319, simulated NS BIT 329, and simulated FC BIT 339. In one embodiment, FDI module 330 is configured to compare one or more of simulated power data 317, simulated position data 327, simulated navigational solution data 337, simulated PS BIT 319, simulated NS BIT 329, and simulated FC BIT 339, with one or more of power 217, position data 227, navigational solution data 237, PS BIT 219, NS BIT 229, and FC BIT 239, respectively, and use such comparison to identify a fault condition for electronic system 200. That is, FDI module 330 is configured to determine which of the generated one or more of simulated power data 317, simulated position data 327, simulated navigational solution data 337, simulated PS BIT 319, simulated NS BIT 329, and simulated FC BIT 339, most closely matches one or more of power 217, position data 227, navigational solution data 237, PS BIT 219, NS BIT 229, and FC BIT 239, respectively, produced by electronic system 200, and determine that electronic system 200 is experiencing the fault associated with the modified parameter that produced the simulated result that most closely matched one of the actual outputs produced by electronic system 200.

Although FDI module 330 has been described as identifying the fault by matching a model module output representing a fault condition to the actual outputs of electronic system 200, the invention is not so limited. That is, one skilled in the art will recognize that other methods can be used to identify a particular fault in electronic system 200 using one or more model module outputs.

FDI module 330 is further configured to determine the magnitude of the fault once the fault has been identified. In one embodiment, FDI module 330 is configured to request that fault signature database 318 further modify the parameter in the model of electronic system 200 one or more additional iterations such that processor 320 will execute model module 315 one or more additional times to generate one or more simulated signals representing the fault being experienced by electronic system 200. FDI module 330 is further configured to compare the one or more simulated signals to the actual signal produced by electronic system 200 and determine the magnitude of the fault based on the comparison.

For example, if the fault is determined to be that corrosion is responsible for increasing the resistance between two components in electronic system 200, the fault signature data responsible for affecting the resistance parameter (e.g., increase or decrease the resistance) between those two components can be used to modify the model of electronic system 200 such that the resulting simulated signal models what the output of electronic system 200 for the resistance between the two components would look like with the modified resistance parameter. The new simulated signal can then be compared to the actual signal generated by electronic system 200 and an estimate of the magnitude of the fault can be determined based on the comparison. Furthermore, the resistance parameter can be modified multiple times to generate multiple simulated signals, which can then be compared to the actual signal generated by electronic system 200 until a match is found. That is, the magnitude of the fault can be determined by the degree to which the modification to the resistance parameter affected the resistance between to two components.

After a fault and/or the magnitude are identified, FDI module 330 may then be configured to inform a user of the fault that electronic system 200 is experiencing and/or the magnitude of the fault. In one embodiment, FDI module 330 is configured to notify the user in real-time via, for example, display 240. In another embodiment, FDI module 330 may be configured to save the identified fault in memory 310, and the user may be able to download the data representing the identified fault and/or magnitude from memory 310 at a later point in time. In either scenario, the user will be able to identify the fault that electronic system 200 is experiencing and/or its magnitude, and replace or repair the source/root cause of the fault.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. An apparatus for diagnosing a fault of a plurality of faults in an electronic system having a plurality of components based on one or more system inputs and system outputs of the electronic system, comprising:
   a memory storing a model of the electronic system, the model configured to capture functional dependencies of the plurality of components, a causal flow in time of data transmitted between the plurality of components, or both;
   a processor coupled to the memory and configured to pass the one or more system inputs through the model to generate one or more simulated outputs; and
   a fault determination/isolation (FDI) module coupled to the processor and configured to be coupled to the electronic system, the FDI module configured to determine the fault based on a comparison of the one or more system outputs and the one or more simulated outputs.

2. The apparatus of claim 1, wherein the FDI module is further configured to identify a cause of the fault based on the comparison.

3. The apparatus of claim 2, wherein the memory further stores one or more fault signatures, each fault signature configured to modify one or more parameters in the model.

4. The apparatus of claim 2, wherein the FDI module is further configured to compare the one or more system outputs and the one or more simulated outputs in determining the fault.

5. The apparatus of claim 4, wherein the FDI module is configured to identify the fault as a fault signature associated with a parameter that results in a simulated output that matches the one or more system outputs.

6. The apparatus of claim 5, wherein the FDI module is further configured to identify a faulty one of the plurality of components based on the associated fault.

7. The apparatus of claim 1, wherein the FDI module is further configured to determine a magnitude of the fault.

8. A system for diagnosing an electronic system fault, comprising:
- an electronic system including a plurality of components generating one or more system outputs based on system inputs;
- memory storing a model of the electronic system, the model configured to capture functional dependencies of the plurality of components, a causal flow in time of data transmitted between the plurality of components, or both;
- a processor coupled to the memory and configured to pass the one or more system inputs through the model to generate one or more simulated outputs; and
- a fault determination/isolation (FDI) module coupled to the processor and the electronic system, the FDI module configured to determine the fault based on a comparison of the one or more system outputs and the one or more simulated outputs.

9. The system of claim 8, wherein the FDI module is further configured to recognize an error in the electronic system based on the one or more system outputs.

10. The system of claim 8, wherein the memory further stores one or more fault signatures, each fault signature configured to modify a parameter in the model.

11. The system of claim 10, wherein the FDI module is further configured to compare the one or more system outputs and the one or more simulated outputs in determining the fault.

12. The system of claim 8, wherein the FDI module is further configured to determine a magnitude of the fault.

13. A method for identifying a fault of a plurality of faults in an electronic system including a plurality of components, comprising the steps of:
- generating a model of the electronic system, the model capturing functional dependencies of the plurality of components, a causal flow in time of data transmitted between the plurality of components, or both;
- passing one or more inputs that are supplied to the electronic system through the model to generate one or more simulated outputs; and
- determining the fault based on a comparison of the one or more simulated outputs and one or more outputs of the electronic system.

14. The method of claim 13, further comprising the step of determining a cause of the fault based on the comparison.

15. The method of claim 14, further comprising the step of comparing the one or more system outputs and the one or more simulated outputs in determining the fault.

16. The method of claim 15, further comprising the step of identifying the fault as a fault associated with a parameter that results in a simulated output that matches the one or more system outputs.

17. The method of claim 16, further comprising the step of identifying a faulty one of the plurality of components based on the associated fault.

18. The method of claim 13, further comprising the step of determining a magnitude of the fault.

* * * * *